INVENTORS
RICHARD A. HIRSCH
EDWARD H. McDONALD
BY HARRY N. NELSON

D. C. Staley
THEIR ATTORNEY

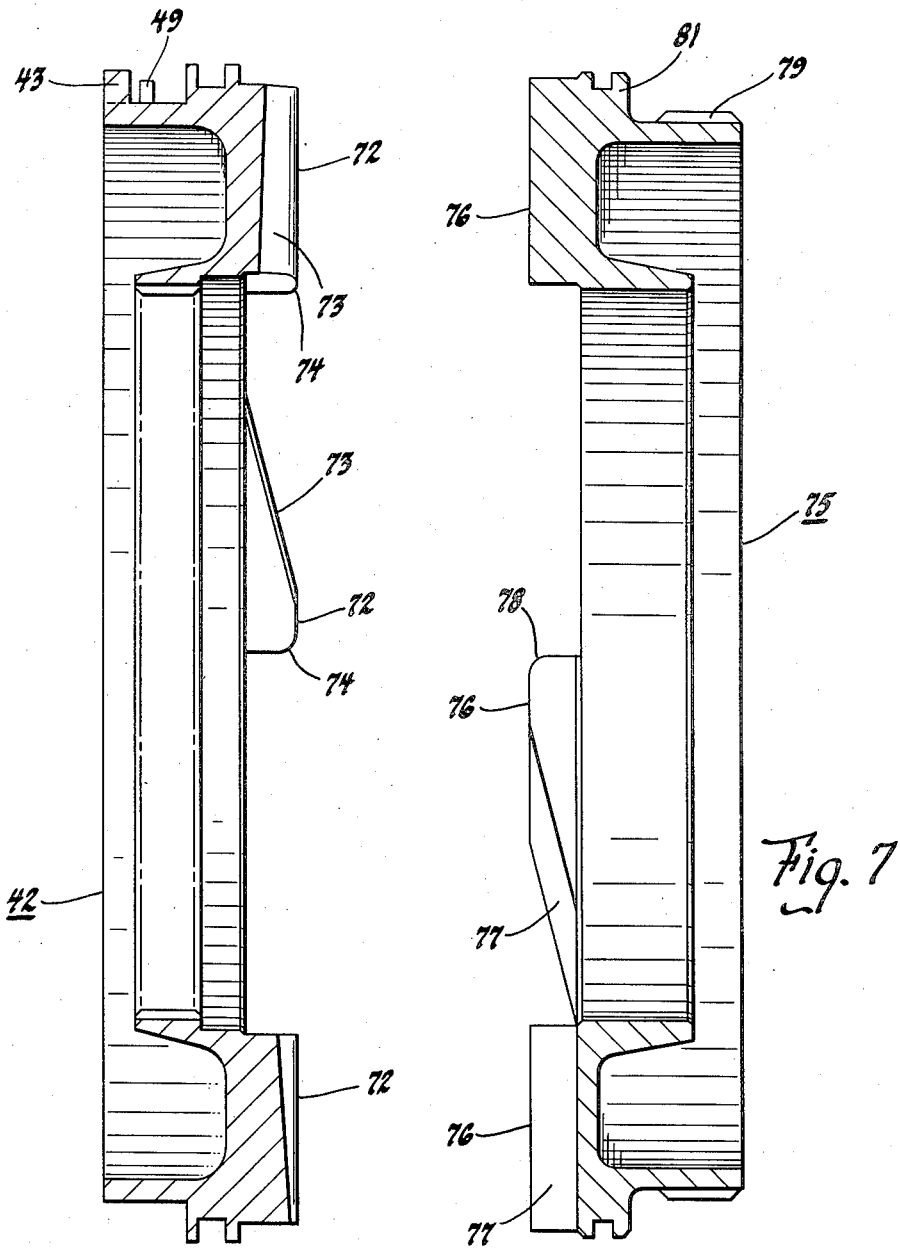

United States Patent Office 2,855,056
Patented Oct. 7, 1958

2,855,056

VARIABLE PITCH PROPELLER ASSEMBLY

Richard A. Hirsch, West Milton, Edward H. McDonald, Tipp City, and Harry N. Nelson, Troy, Ohio, assignors to General Motors Corporation, Detroit, Mich., a corporation of Delaware Application April 2, 1957, Serial No. 650,271

14 Claims. (Cl. 170—135.743)

This invention pertains to propellers, and particularly to variable pitch propellers.

In hydraulically controlled variable pitch propellers designed to be driven by gas turbines, wherein the propeller hub is enclosed by a spinner, it is necessary to incorporate means for cooling the hydraulic fluid for the pitch adjusting mechanism. However, in order to reduce to a minimum the fire hazards attendant with a gas turbine that malfunctions, in which instance the propeller blades are feathered to reduce the drag to a minimum, the flow of cooling air through the spinner must be shut off when the propeller blades are feathered. The present invention pertains to a variable pitch propeller assembly including air shut-off means for preventing the flow of air through the spinner between air inlet and air outlet openings therein when the propeller blades are moved to the feathered position. The air shut-off means are operated automatically from a member supported for rotation about the horizontal propeller axis and connected to the blades so as to have a predetermined angular position for each pitch position of the propeller blades. This member can also conveniently control the operation of a releasable mechanism low pitch stop which normally prevents movement of the blades to a negative thrust position. Accordingly, among our objects are the provision of a variable pitch propeller having a spinner with air inlet and air outlet openings including means for preventing the flow of air through the spinner between the inlet and outlet openings when the propeller blades are feathered; the further provision of air shut-off means for a spinner which are automatically closed when the blades are moved into the feathering range; the further provision of air shut-off means for a spinner of a variable pitch propeller which are actuated only when the propeller blades are moved towards the feathering range; the further provision of a shutter assembly for a variable pitch propeller having a spinner including a pair of relatively rotatable annular elements cooperable to prevent the flow of air through the spinner when the propeller blades are feathered; and the still further provision of a variable pitch propeller assembly including a member rotatable with the blades during pitch changing movement thereof and means associated with the member constituting a releaseable mechanical low pitch stop.

The aforementioned and other objects are accomplished in the present invention by incorporating a sleeve in the propeller hub which is rotatable about the horizontal propeller axis and is connected to the master gear, or coordinating gear, driven by the several blade gears, for actuating the air shut-off means and the mechanical low pitch stop.

Specifically, the propeller is of the general type as shown in copending application Serial No. 572,348, filed March 19, 1956, in the name of Bodem et al., and assigned to the assignee of the present invention. Thus, the propeller includes a hub having a plurality of propeller blades journalled in sockets thereof for movement about their longitudinal axes from a negative thrust position to a feathered position. Each blade is actuated by an individual, fluid pressure operated servo motor and the pitch positions of the several propeller blades are coordinated by the master gear. The hydraulic fluid for actuating the pitch changing servo motors is contained in a regulator attached to and rotatable with the propeller hub, the flow of hydraulic fluid being controlled by valves. The propeller also includes a heat exchange reservoir through which oil is continuously circulated during propeller rotation for cooling the oil, or hydraulic fluid, for actuating the pitch adjusting servo motors.

The propeller hub, the regulator and the heat exchange reservoir are enclosed by a fairing, or spinner. The spinner includes a central air inlet opening through which air can flow during movement of the aircraft, air being directed across the outer surface of the heat exchange reservoir for cooling the oil therein. The spinner is supported on the hub by a pair of bulkhead assemblies, one of which is located forwardly of the propeller blades and the other of which is located to the rear of the propeller blades. The forwardly located bulkhead assembly includes a pair of relatively movable annular elements constituting a shutter assembly, or air shut-off means. One of the annular elements is rigidly attached to the hub and has a plurality of circumferentially spaced openings therein through which air can flow and be discharged through a plurality of air outlet openings in the spinner. The air outlet openings in the spinner are formed in the rear spinner bulkhead and stationary cowling attached to the turbine gear box. The second annular element has a plurality of circumferentially spaced shutters and is supported for rotation relative to the hub. The rotatable annular element is operatively connected with the master gear through the member, or sleeve, which rotates about the horizontal propeller axis during pitch changing movement of the blades so that the shutters close the openings in the stationary annular element when the propeller blades are moved into the feathering range. By feathering range, we mean an angular position of the propeller blades between a positive 80° and a full feather position.

In the preferred embodiment, the rotatable annular element having the shutters is connected through an intermittent gear drive with an annulus attached to the sleeve which is driven by the master gear. In this embodiment the shutter element is only actuated during movement of the blades in a limited range, for instance, a positive 60° to a positive 80°. In other words, during pitch changing movement of the blades between the maximum negative thrust angle and a positive 60° angle movement is not imparted to the shutter element. However, during movement of the propeller blade between a positive 60° and positive 80° the shutter element is driven so that at a positive 80° the shutter element completely closes the openings in the stationary annular element thereby preventing the flow of air through the spinner between the inlet and outlet openings. Continued movement of the propeller blades to the fully feathered, or maximum pitch position does not impart any further movement to the movable shutter element, and accordingly the openings in the stationary annular element remain closed.

In the preferred embodiment, the annulus for actuating the movable shutter element has a plurality of axially extending lugs thereon, one face of each lug being chamfered and the edge of the other face of each lug being radiused. This annulus constitutes the rotatable member of a positive mechanical low pitch stop which is engageable with a complementary nonrotatable annulus having a plurality of circumferentially spaced jaws of identical configuration. The nonrotatable annulus is connected to the hub by straight splines so as to be capable of axial movement relative to the hub whereby the stop annuli may be disengaged to permit movement of the blades into the negative thrust range. The nonrotatable annulus has a piston surface thereon which can be subjected to hydraulic pressure so as to overcome normally operable resilient means which urge the nonrotatable annulus into engagement with the rotatable annulus. The mechanical low pitch stop functions in a manner similar to that shown in copending application Serial No. 571,523, filed March 14, 1956, in the name of Hirsch et al., and assigned to the assignee of this invention. However, by reason of the radiused edges on the coengaging faces of the jaws, the mechanical low pitch stop can be released under load, that is, with the complementary jaws in engagement, without shearing the edges of the jaws.

In the second embodiment, the rotatable shutter element is rotated continuously during pitch changing movement of the propeller blades. Thus, the annulus which is connected to the sleeve driven by the master gear has a gear segment thereon which engages a pinion assembly, the pinion assembly engaging a gear segment on the rotatable shutter element. However, as in the preferred embodiment the rotatable shutter element does not completely close the openings in the nonrotatable shutter element until the blades are moved into the feathering range. Thus, in the second embodiment air flow through the spinner between the air inlet and outlet openings is only prevented when the propeller blades are in the feathering range between a positive 80° and a fully feathered position.

Further objects and advantages of the present invention will be apparent from the following description, reference being had to the accompanying drawings, wherein preferred embodiments of the present invention are clearly shown.

In the drawings:

Figure 4 is a fragmentary view, in elevation, depicting one of the pinion assemblies and the relative location of the parts when the movable shutter assembly has closed the openings in the nonrotatable shutter element.

Figure 5 is an enlarged view in elevation of the pinion assembly shown in Figure 4.

Figure 6 is a sectional view of the rotatable pitch stop annulus.

Figure 7 is a sectional view of the nonrotatable pitch stop annulus.

Figure 1:
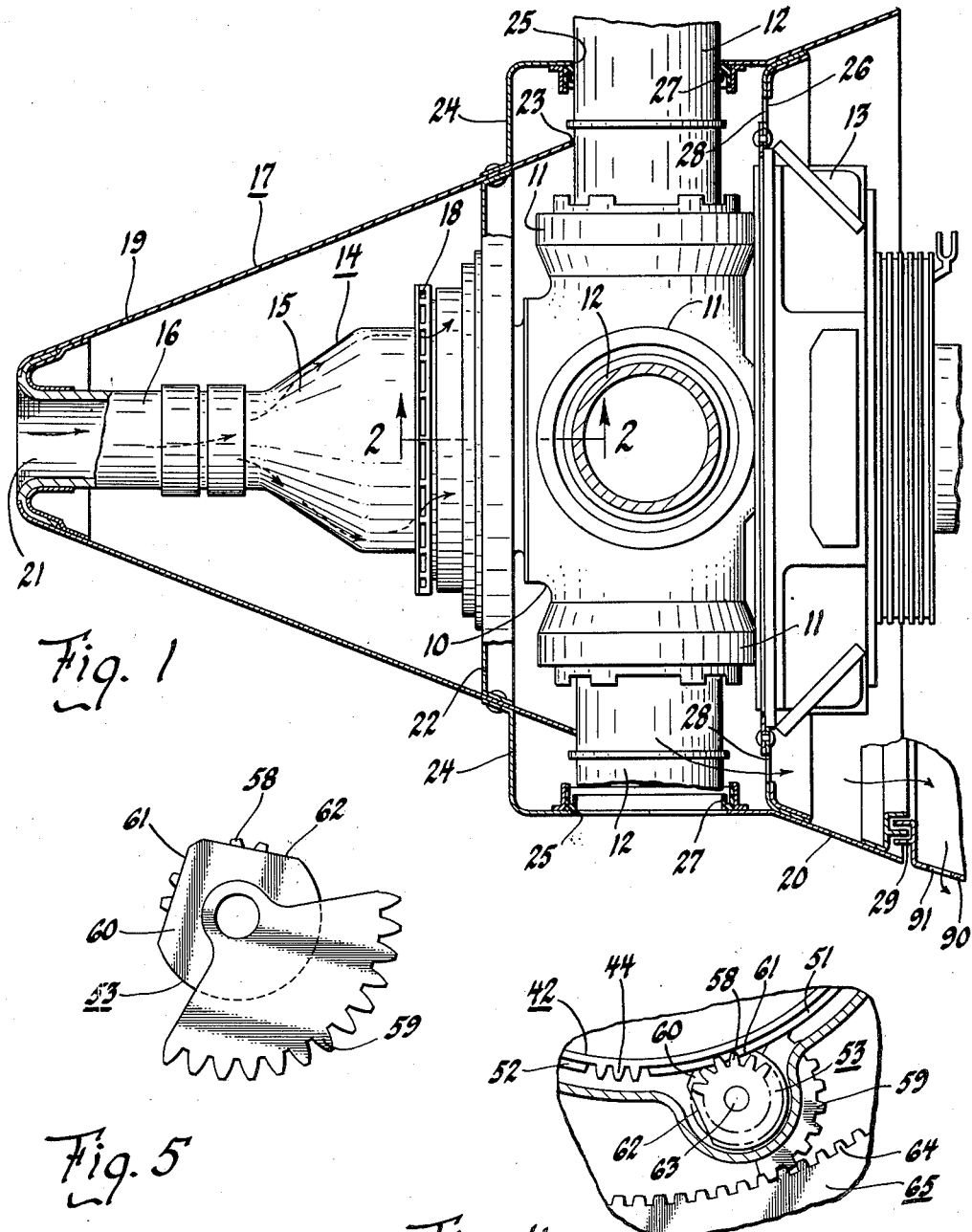
Figure 1 is a fragmentary view, partly in section and partly in elevation, depicting a propeller assembly constructed according to this invention.

With particular reference to Figure 1, a variable pitch aircraft propeller is shown including a hub 10 having a plurality of radially extending sockets 11 within which propeller blades 12 are journalled for rotation about their longitudinal axes for movement in a pitch range from a negative thrust position to a fully feathered position. A regulator assembly 13 is attached to the rear of the propeller hub 10 and rotates therewith. A heat exchange reservoir for the hydraulic fluid used to actuate the pitch adjusting motors is designated generally by the numeral 14, the heat exchange reservoir being attached to the front of the propeller hub. The heat exchange reservoir is enclosed by a cover 15, the front end of which connects with an air inlet tube 16 attached to a spinner 17. The cover, or housing 15 has a plurality of air outlet openings 18 through which air is discharged into the interior of the spinner 17.

The spinner 17 comprises a nose section 19 and a rear section 20. The nose section 19 has an air inlet opening 21 which connects with the air inlet tube 16. The nose section 19 is supported by a bulkhead 22 carried by the front of the propeller hub 10 and includes cutout openings 23 through which the propeller blades extend. The nose section 19 also includes platform portions or islands 24 which have openings 25 through which the propeller blades extend. The openings 25 in the platform 24 are closed by seals 27 which resiliently engage the shank portions of the propeller blades 12. The nose portion 19 is connected by suitable fasteners, not shown, to the rear section 20 which is attached to a rear bulkhead 26 which is secured to the housing of the regulator assembly 13. The rear bulkhead 26 has a plurality of circumferentially spaced openings 28 constituting air outlets.

During flight of the aircraft, not shown, on which the propeller assembly of this invention is mounted, ram air is forced through the inlet opening 21 and passes through the inlet tube 16. This air flows across the heat exchange reservoir to effect cooling thereof and is subsequently discharged through openings 18 into the interior of the spinner as indicated by the arrows in Figure 1.

Figure 2:
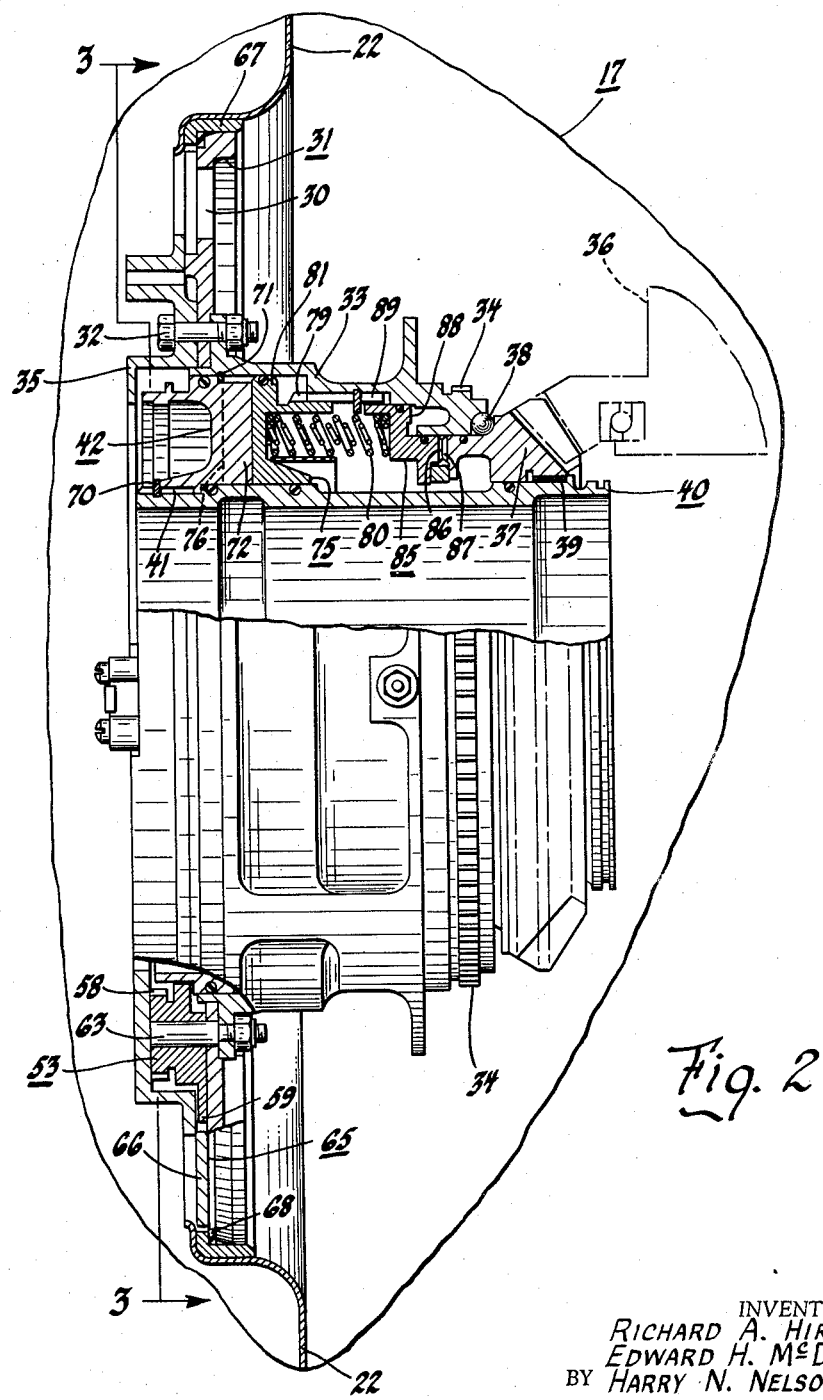
Figure 2 is a fragmentary view, partly in section and partly in elevation, with certain parts removed, taken generally along line 2—2 of Figure 1.

With particular reference to Figure 2, the air which is discharged from the openings 18 can pass through openings 30 in a nonrotatable annular element 31 so as to be discharged through the air outlet openings 28 in the bulkhead 26. The rear section 20 of the spinner has a labyrinth type seal 29 with stationary cowling 90 having air outlet openings 91 through which the air flowing through openings 28 can be discharged to atmosphere. The annular element 31 is connected by a plurality of bolts 32 to a housing 33 which is bolted to the propeller hub, not shown, in Figure 2. The housing 33 has a straight splined portion 34 which mates with a complementary splined portion in the hub, not shown, so as to prevent rotation of the housing 33, relative to the hub 10. The bolts 32 also connect an adapter plate 35 to the housing 33, the heat exchange reservoir 14 being connected to the adapter plate 35 by suitable means, not shown.

In aircraft powered by gas turbine driven propellers, it is essential to feather the blades of a propeller which is driven by a failing turbine so as to reduce the drag produced by a windmilling propeller to a minimum. In addition, in order to minimize the fire hazards, it has been determined that the air flow path through the spinner should be closed when the propeller blades are in the feathering range. Accordingly, in the preferred embodiment of this invention, the air flow path through openings 30 in the annular element 31 is automatically closed when the propeller blades are at an angle between a positive 80° and a fully feathered position.

Referring again to Figure 2, each propeller blade has attached thereto a bevel type blade gear indicated in phantom by numeral 36. The blade gears 36 mesh with a bevel type master gear 37 which coordinates the pitch adjusting movement of all the blades. The master gear 37 is journalled for rotation about the horizontal propeller axis by ball bearing assembly 38. The master gear 36 has a predetermined angular position for every pitch position of the propeller blades through the complete range of movement from a maximum negative thrust position to the fully feathered position. The master gear 37 is connected by straight splines 39 to a forwardly extending sleeve, or member 40 rotatable about the horizontal propeller axis. The sleeve 40 is connected by straight splines 41 to a rotatable annulus 42.

Figure 3:
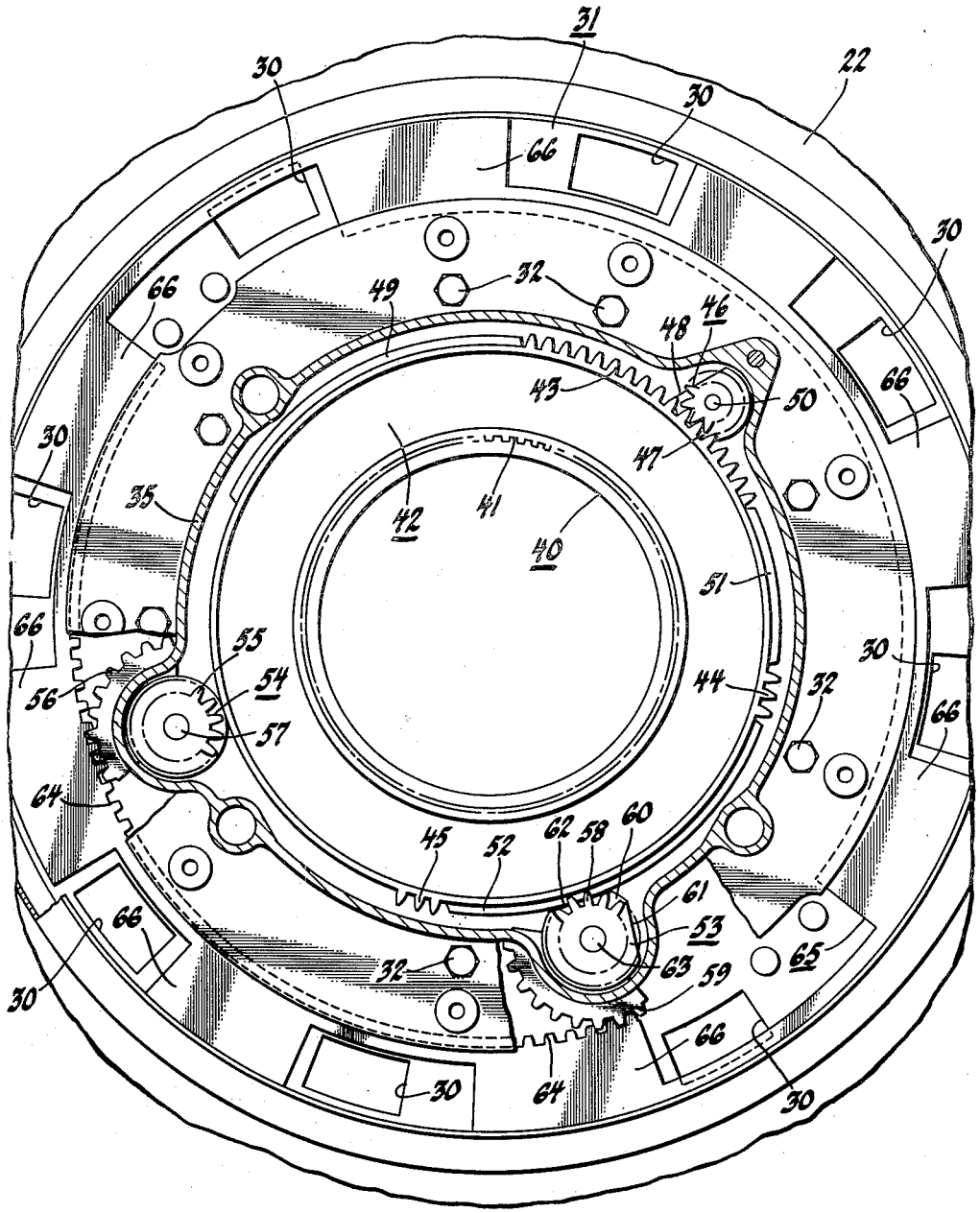
Figure 3 is a fragmentary view, partly in elevation and partly in section, taken along line 3—3 of Figure 2.

With reference to Figure 3, the rotatable annulus 42 has three circumferential spaced toothed segments 43, 44 and 45. Rotation of the propeller blades in an increase pitch direction towards the fully feathered position effects rotation of the sleeve 40 and the annulus 42 in the clockwise direction as viewed in Figure 3. The gear segment 43 is engageable with a feedback pinion assembly 46 of the type shown in Patent #2,761,519, Hirsch. Thus, the pinion assembly 46 includes a pinion gear 47 engageable with the teeth 43 and an annulus axially spaced from the pinion gear 47 having a flat 48 thereon engageable with a cam surface 49 formed on the annulus 42 and spaced axially from the gear teeth 43. The cam surface 49 is relieved adjacent the gear teeth 43. This arrangement constitutes an intermittent feedback drive such that when the pinion gear 47 engages the teeth 43 rotation will be imparted to a feedback shaft 50 to which the pinion assembly 46 is attached. However, when the cam 49 engages the flat 48 and the pinion gear 47 is out of engagement with the teeth 43, rotation of the pinion assembly 46 and the feedback shaft 50 will be precluded.

The toothed sections 44 and 45 include three teeth. Cam surfaces 51 and 52, axially spaced from the teeth 44 and 45, are formed on the annulus 42. The teeth 44 are engageable with a pinion assembly 53 and the teeth 45 are engageable with a pinion assembly 54. The pinion assembly 54 includes a pinion gear 55, which is integral with a gear segment 56, axially spaced from the pinion gear 55. Pinion assembly 54 is rotatably supported on a shaft 57 supported in the adapter plate 35.

With particular reference to Figure 5, the pinion assembly 53 includes a pinion gear 58 which is integral with a gear segment 59 and the hub 60 having a pair of flats 61 and 62 thereon. The pinion gear 58 is located on one side of the hub 60 and the gear segment 59 is located on the other side of the hub 60. With reference to Figures 3 and 4, the flat 61 is engageable with the cam 51 so as to prevent rotation of the pinion assembly 53 when the flat 61 engages the cam 51 as shown in Figure 4. Similarly when the flat 62 engages the cam 52 rotation of the pinion assembly 53 will be prevented as shown in Figure 3. The cams 51 and 52 are relieved adjacent the tooth section 44 so that when the teeth 44 engage the pinion gear 58 rotation will be imparted to the pinion assembly 53. The pinion assembly 53 is rotatably supported on a shaft 63 carried by the adapter plate 35.

The gear segments, or sector gears, 56 and 59 have toothed engagement with gear segments 64 formed on a rotatable shutter element 65. The rotatable shutter element 65 includes a plurality of circumferentially spaced shutters 66 for closing the openings 30 in the nonrotatable annular element 31. As seen in Figure 3, the nonrotatable annular element 31 has eight circumferentially spaced openings 30. The rotatable annular element 65 has eight circumstantially spaced shutters 66 arranged to close the openings 30 when the propeller blades are moved into the feathering range.

During pitch changing movement of the propeller blades, the master gear 37 is rotated about the horizontal propeller axis and drives the sleeve 40. In Figure 3, the sleeve 40 and the annulus 42 are in a position indicative of a low positive pitch position of the propeller blades. As the blades move towards the maximum negative pitch angle, the sleeve 40 and the annulus 41 are rotated in the counterclockwise direction as viewed in Figure 2. During this movement of the blades, the rotatable shutter element 65 will not rotate relative to the nonrotatable shutter element 31 since the flat 62 engages the cam 52. As the propeller blades are moved towards the feathered position, the sleeve 40 and the annulus 42 are moved in the clockwise direction as viewed in Figure 2. During this movement of the propeller blades, the shutter element 65 will likewise remain stationary until the teeth 44 engage the pinion gear 58 and the teeth 45 engage the pinion gear 55. This will occur when the propeller blades are at a high positive angle, for instance, a positive 60°, which angle is above the angle of the propeller blades during normal flight. Continued movement of the propeller blades above 60° will impart rotation to the pinion assemblies 53 and 54 in the counterclockwise direction as viewed in Figure 3. Counterclockwise rotation of the pinion assemblies 53 and 54 will effect counterclockwise movement of the shutter element 65 relative to the shutter element 31 so that the shutter 66 will completely close the openings 30 when the propeller blades reach an angle of a positive 80°. Continued movement of the propeller blades between 80° and the fully feathered position will not impart further movement to the rotatable shutter element 65 since at this time the flat 61 on the pinion assembly 53 will engage the cam 51 on the annulus 42 as shown in Figure 4. As seen in Figure 2, the rotatable element 65 is supported between the adapter plate 35 and the nonrotatable shutter element 31. In addition, the annular shutter element 31 carries a ring 67 on which the spinner bulkhead 22 is supported, a seal 68 being interposed between the ring 67 and the shutter element.

With reference to Figures 2, 6 and 7, the annulus 42 is restrained against axial movement relative to the sleeve 40 and the housing 33 by a pair of snap rings 70 and 71. The annulus 42 has a plurality of circumferentially spaced, axially extending jaws 72. One face of each jaw 72 is chamfered, as indicated by numeral 73. In addition, the edge of the other face of each jaw 72 is radiused as indicated by numeral 74. The rotatable annulus 42 constitutes a mechanical low pitch stop member which is engageable with a complementary nonrotatable annulus 75. As seen in Figure 7, the annulus 75 has a complementary set of axially extending jaws 76, one face of each jaw being chamfered as indicated by numeral 77 and the edge of the other face being radiused as indicated by numeral 78. The nonrotatable annulus 75 is connected by straight splines 79 to the housing 33 and thus is capable of axial movement relative thereto into and out of engagement with the annulus 42.

The mechanical low pitch stop operates in the manner as set forth in the aforementioned copending application, Serial No. 571,523, and thus the annulus 75 is normally biased into engagement with the annulus 42 by resilient means 80. The annulus 75 includes a piston surface 81 which can be subjected to hydraulic fluid under pressure so as to move the annulus 75 axially to the right as viewed in Figure 2 out of engagement with the annulus 42. The radiused edges on the complementary jaws of the pitch stop members permit the members to be disengaged under load without shearing the edges of the jaws. The chamfered faces on the jaws automatically effect axial movement of the stop member 75 when the blades are moved to the feathered position since they ride upon each other. However, in order to move the blades into the negative thrust range, the stop member 75 must be moved to the right as viewed in Figure 2 by hydraulic pressure acting on the piston surface 81.

The coil springs, or resilient means 80 also act on a nonrotatable pitch lock member 85 supported for axial movement within the housing 33. The locking member 85 has ratchet teeth 86 engageable with ratchet teeth 87 formed on the master gear 37 during a limited range of blade angles. The nonrotatable pitch locking member 85 also includes a piston surface 88 which can be subjected to hydraulic pressure to prevent engagement of the locking members. The nonrotatable pitch locking member 85 is connected by straight splines 89 to the housing 33.

Figure 8:
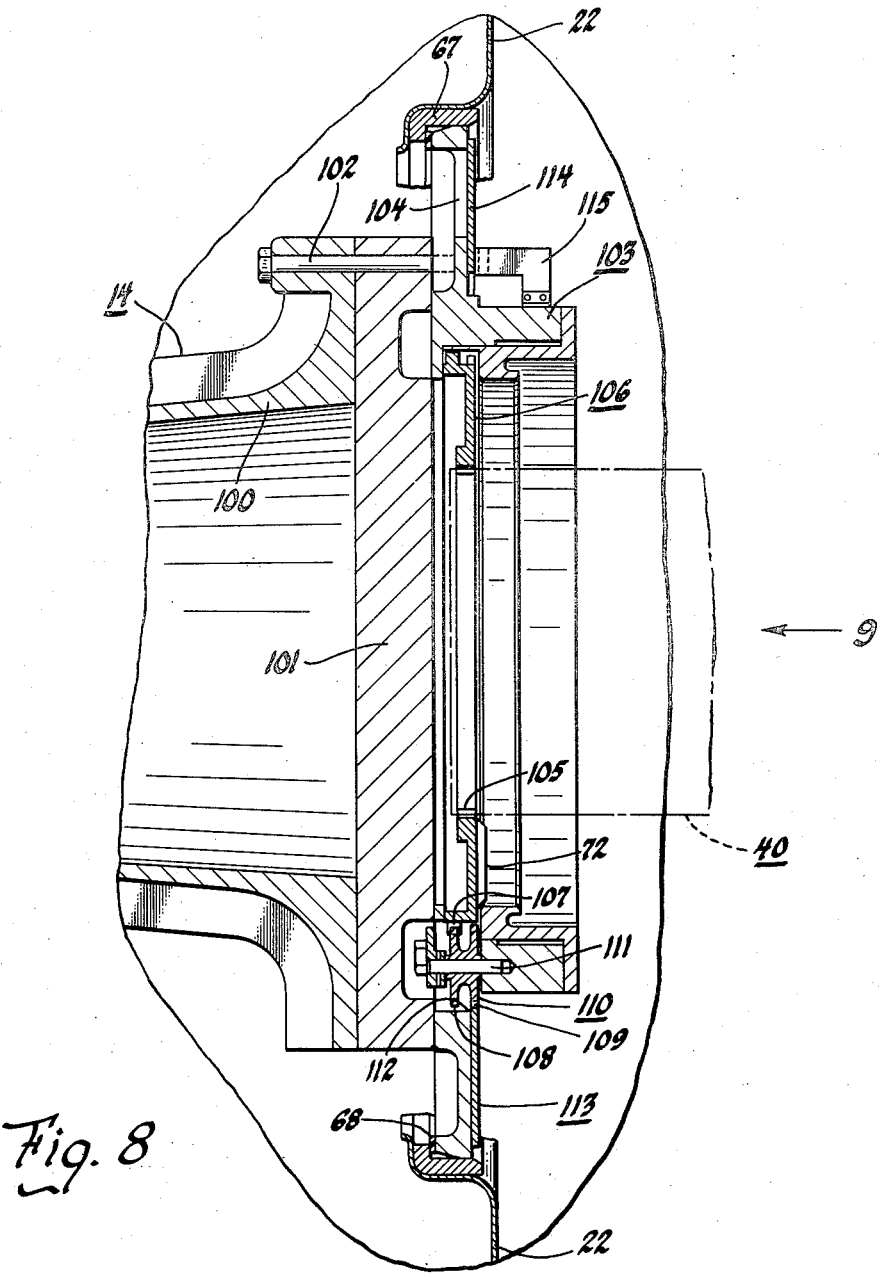
Figure 8 is a fragmentary sectional view illustrating the air shut-off mechanism constructed according to the second embodiment of this invention taken along line 8—8 of Figure 9.
Figure 9:
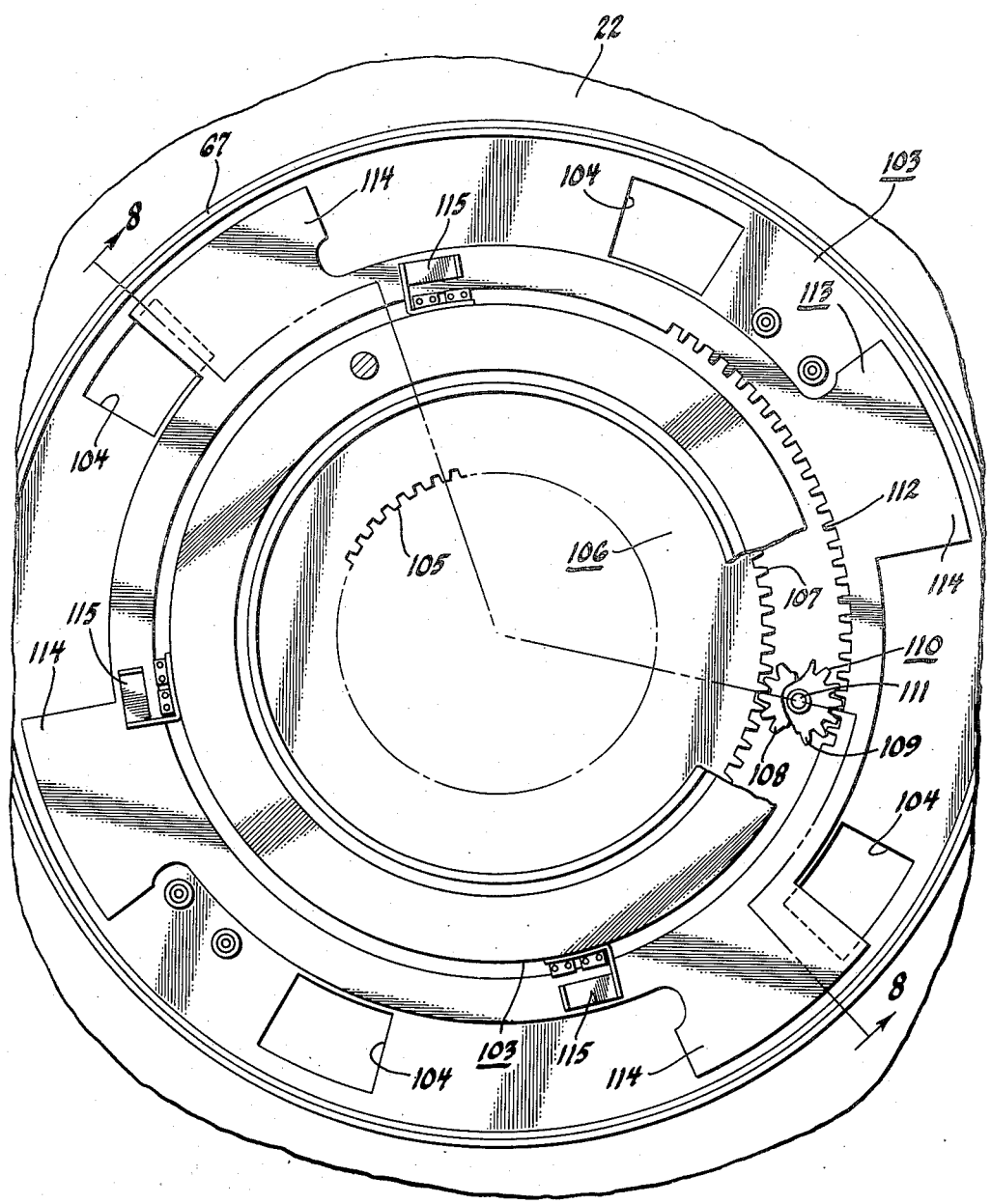
Figure 9 is a fragmentary view, in elevation, taken in the direction of arrow 9 of Figure 8.

With particular reference to Figures 8 and 9, a modified embodiment of the air shut-off means will be described, similar numerals depicting similar parts throughout the several views. As seen in Figure 8, the heat exchange reservoir 14 includes a housing 100 having a back plate 101, the housing 100 and the back plate 101 being connected to the annular element 103 by bolts 102, The annular element 103 has a plurality of openings 104 and carries the ring 67 on which the spinner bulkhead 22 is supported.

The sleeve 40 which rotates with the master gear is indicated in phantom in Figure 8, this sleeve being connected by straight splines 105 to an annulus 106 having axially extending jaws 72. As seen in Figure 9, the annulus 106 has a toothed peripheral segment 107 which is always in mesh with a pinion gear 108 of a pinion gear assembly 110. The pinion assembly includes a second pinion gear 109 which meshes with a gear segment 112 formed on an annular element 113 having a plurality of shutters 114 arranged to close the openings 104, and the annular element 103. The pinion gear assembly 110 is journalled on a shaft 111 carried by the annular element 103.

In this embodiment, the rotatable annular shutter element 113 is located to the rear of the nonrotatable annular element 103 having the openings, and is maintained in engagement therewith by a plurality of springs 115 which are attached to the annular element 103 and engage the shutter element 113. As viewed in Figure 9, the movement of the propeller blades toward the feathered position effects rotation of the annulus 106 in the counterclockwise direction. The annulus 106 is shown in the maximum negative thrust position of the propeller blades in Figure 9. Since the pinion gear assembly 110 continuously meshes with the gear segment 107 on the annulus 106 and the gear segment 112 on the movable shutter element 113, the shutter element 113 will be continuously rotated in the clockwise direction as viewed in Figure 9, during movement of the propeller blades to the feathered position. In this embodiment, the shutter 113 likewise completely closes the openings 104 when the blades reach an angle of a positive 80°. Moreover, since the shutter element 113 continues to rotate until the blades reach the fully feathered position, the arcuate extent of the shutters 114 is greater than the openings 104. Thus, the openings 104 are completely closed when the propeller blades are in the feathering range between a positive 80° and the fully feathered position. When the propeller blades are within the range between the maximum negative angle and a positive 80°, the openings 104 will be at least partially open, and during the greater part of this range will be completely open.

From the foregoing it is manifest that the present invention provides a unique arrangement for completely shutting off the air flow through a spinner when the propeller blades are in the feathering range. In addition, in the preferred embodiment of this invention the shutter element has imparted thereto intermittent movement and is driven from a member which also controls the operation of a positive mechanical low pitch stop.

While the forms of embodiments of the invention as herein disclosed constitute preferred forms, it is to be understood that other forms might be adopted, as may come within the scope of the claims which follow.

What is claimed is as follows:

1. In a variable pitch propeller having a hub, a plurality of blades rotatably mounted in the hub for movement about their longitudinal axes to different pitch positions including a feathered position, a spinner enclosing said hub having an air inlet opening and an air outlet opening, means attached to said hub and engaging said spinner for supporting the spinner on the hub, said spinner supporting means having at least one opening therein through which air can flow between said inlet and outlet openings, an element supported for movement relative to the hub and operable to close the opening in said spinner supporting means, and means operatively interconnecting said element and said blades for automatically moving said element to the closed position when the blades are moved to the feathered position.

2. In a fairing assembly for an aircraft propeller having outwardly extending variable pitch blades movable to a feathered position, a spinner extending forwardly of the propeller having an air inlet opening and an air outlet opening, and means within the spinner and operatively connected with said blades for preventing air flow through the spinner between said inlet and outlet openings when the blades are moved to the feathered position.

3. A shutter assembly for a variable pitch propeller having blades movable to a feathered position and a spinner enclosing said propeller having an air inlet opening and an air outlet opening, including a pair of annular elements supported for relative rotation within the spinner, one of said elements having a plurality of openings therein through which air can flow between the inlet and outlet openings of the spinner, the other of said elements having a plurality of shutters for closing said openings, and means operatively connecting one of said annular elements with said blades for effecting relative movement between said annular elements so that the openings in said one annular element are closed by the shutters of the other annular element when the blades are in the feathered position.

4. A shutter assembly for a variable pitch propeller having blades movable to a feathered position and a spinner enclosing said propeller having an air inlet opening and an air outlet opening, including, a first annular element disposed within the spinner having a plurality of openings within the spinner having a plurality of openings therein through which air can flow between the inlet and outlet openings of the spinner, a second annular element having a plurality of shutters, means supporting the second annular element for rotation relative to the first annular element, and means operatively connecting the second annular element with said blades for rotating the second annular element so that the shutters thereof closes the openings in the first annular element when the blades are in the feathered position.

5. In a variable pitch propeller, a hub having a plurality of blades journalled therein for rotation about their longitudinal axes between a negative thrust position and a feathered position, a spinner including said hub having an air inlet opening and an air outlet opening, a member rotatably supported within said hub and connected with the blades so as to rotate about a horizontal propeller axis during pitch changing movement of said blades, a first annulus attached to said member having gear teeth on at least a portion of its periphery and a plurality of axially extending jaws, each jaw having a chamfer on one face and a radius on the edge of the other face, a second annulus restrained against rotation relative to the hub but capable of axial movement relative thereto, the second annulus having a complementary set of axially extending jaws with a chamfer on one face and a radius on the edge of the other face, resilient means engaging the second annulus for normally maintaining it in engagement with the first annulus to prevent rotation of the first annulus and movement of the blades to a negative thrust position while permitting movement of said blades to the feathered position, said second annulus having a piston surface subject to hydraulic pressure for moving said second annulus out of engagement with the first annulus to permit rotation of the first annulus and movement of said blades to the negative thrust position, and means driven by the teeth on the first annulus for preventing air flow through the spinner between the inlet and outlet openings when the blades are in the feathered position.

6. In a variable pitch propeller, a hub having a plurality of blades journalled therein for rotation about their longitudinal axes between a negative thrust position and a feathered position, a member rotatably supported within said hub and connected with the blades so as to rotate about the horizontal propeller axis during pitch changing movement of the blades, a first annulus attached to said member having a plurality of axially extending jaws, each jaw having a chamfer on one face and a radius on the edge of the other face, a second annulus restrained against rotation relative to the hub but capable of axial movement relative thereto, the second annulus having a complementary set of axially extending jaws with a chamfer on one face and a radius on the edge of the other face, and resilient means engaging said second annulus for normally maintaining it in engagement with the first annulus to prevent rotation of said first annulus and movement of said blades to the negative thrust position, the second annulus having a piston surface which can be subjected to hydraulic pressure for moving the second annulus out of engagement with the first annulus to permit rotation of the first annulus and movement of the blades to the negative thrust position, the radiused edges on said complementary jaws permitting disengagement of said first and second annuli under load without shearing the edges of said jaws.

7. In a variable pitch propeller, a hub having a plurality of blades journalled therein for rotation about their longitudinal axes between a negative thrust position and a feathered position, a member supported within said hub and connected with the blades so as to rotate about the horizontal propeller blade axes during pitch changing movement of the blades, a first annulus attached to said member having a plurality of axially extending jaws, each jaw having a radius on the edge of one face, a second annulus restrained against rotation relative to the hub but capable of axial movement relative thereto, the second annulus having a complementary set of axially extending jaws with a radius on the edge of one face, and resilient means engaging the first annulus for maintaining it in engagement with the first annulus to prevent movement of the blades to the negative thrust position, the second annulus having a piston surface which can be subjected to hydraulic pressure for moving the second annulus out of engagement with the first annulus to permit movement of the blades to the negative thrust position, the radiused edges on said complementary jaws permitting disengagement of said first and second annuli under load without shearing the edges of the said jaws.

8. In a variable pitch propeller, a hub, blades rotatably journalled in the hub for pitch changing movement to a feathering range, a spinner enclosing the hub having an air inlet opening and an air outlet opening, a member rotatably journalled within the hub and operatively connected to the blades so as to rotate during pitch changing movement of said blades, air shut-off means within the spinner movable between an open and a closed position, and means associated with said member and said air shut-off means precluding transmission of movement between said member and said air shut-off means during a first range of movement of said propeller blades and affording transmission of movement between said member and said air shut-off means during a second range of movement of said propeller blades so as to move said air shut-off means to a closed position when the blades are in the feathering range.

9. In a variable pitch propeller, a hub, a plurality of blades journalled in the hub for pitch changing adjustment between a negative thrust position and a feathered position, a spinner enclosing the said hub having an air inlet opening and an air outlet opening, a master gear journalled within the hub and operatively connected to said blades whereby pitch adjusting movement of said blades effects movement of said master gear, a member disposed within the hub and operatively connected with the master gear, air shut-off means within the spinner having an open position and a closed position, and means associated with said member and said air shut-off means precluding transmission of movement therebetween during a first range of pitch adjustment of said blades and affording transmission of movement therebetween during a second range of movement of said blades so as to move said air shut-off means to the closed position when the propeller blades are moved to the feathered position.

10. In a fairing assembly for an aircraft propeller, a hub having a plurality of blades journalled therein for movement about their longitudinal axes to a feathered position, a spinner enclosing said hub having an air inlet and an air outlet, and air shutoff means within the spinner and operatively connected with the blades for preventing the air flow through the spinner between the inlet and outlet when the blades are moved to the feathered position.

11. In a variable pitch propeller having a hub, a plurality of blades rotatably mounted in the hub for movement about their longitudinal axes to a feathering range, a spinner enclosing said hub having an air inlet and an air outlet, means attached to the hub and engaging said spinner for supporting the spinner on the hub, said means having a plurality of openings therein through which air can flow between the inlet and outlet openings, an element supported for movement relative to the hub and operable to close said openings in said spinner supporting means, and means operatively interconnecting said element and said blades for automatically moving said element to the closed position when the blades are moved to the feathering range.

12. The combination set forth in claim 11 wherein each propeller blade has a blade gear operatively connected thereto, and wherein said last recited means includes a master gear journalled within said hub for rotation about the horizontal propeller axis and meshing with said blade gears, an annulus operatively connected with said master gear and means interconnecting the annulus and said element.

13. The combination set forth in claim 12 wherein the element and the annulus have gear segments formed thereon, and wherein the means interconnecting the annulus and the element includes a pinion gear assembly meshing with the gear segments and said element and said annulus.

14. The combination set forth in claim 12 wherein the element has at least one gear segment thereon, wherein the annulus has at least one gear segment thereon with arcuate cams on each side of the gear segment and spaced axially therefrom, and wherein the means interconnecting the annulus and the element includes a pinion gear assembly continuously meshing with the gear segment on said element and having follower means engageable with said cams to preclude transmission of movement between said annulus and said element during predetermined movements of said annulus, said pinion gear assembly meshing with the gear segment on said annulus during another predetermined movement of said annulus to move said element to the closed position.

References Cited in the file of this patent

UNITED STATES PATENTS

| | | |
|---|---|---|
| 2,396,598 | Neumann et al. | Mar. 12, 1946 |
| 2,619,795 | Drake | Dec. 2, 1952 |
| 2,752,111 | Schairer | June 26, 1956 |
| 2,779,423 | Cushman | Jan. 29, 1957 |